(12) United States Patent
Liderman et al.

(10) Patent No.: US 11,050,791 B2
(45) Date of Patent: Jun. 29, 2021

(54) ADAPTIVE OFFLINE POLICY ENFORCEMENT BASED ON CONTEXT

(71) Applicant: VMware, Inc., Palo Alto, CA (US)

(72) Inventors: Eugene Liderman, Olney, MD (US); Stephen Turner, Atlanta, GA (US); Simon Brooks, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 280 days.

(21) Appl. No.: 16/019,950

(22) Filed: Jun. 27, 2018

(65) Prior Publication Data

US 2020/0007580 A1  Jan. 2, 2020

(51) Int. Cl.
*H04L 29/06* (2006.01)

(52) U.S. Cl.
CPC .......... *H04L 63/20* (2013.01); *H04L 63/0838* (2013.01); *H04L 63/0861* (2013.01)

(58) Field of Classification Search
CPC ............ G06F 21/45; G06F 21/62–629; H04L 63/0838; H04L 63/0846; H04L 63/0861; H04L 63/10; H04L 63/105; H04L 63/20–205; H04W 12/0027; H04W 12/005–00524
See application file for complete search history.

(56) References Cited

U.S. PATENT DOCUMENTS

| | | | | |
|---|---|---|---|---|
| 2011/0314549 | A1* | 12/2011 | Song | G06F 21/31 726/25 |
| 2014/0007117 | A1* | 1/2014 | Sima | G06F 8/65 718/102 |
| 2015/0116212 | A1* | 4/2015 | Freed | G06F 1/1686 345/156 |
| 2017/0180339 | A1* | 6/2017 | Cheng | G06F 21/577 |
| 2017/0374070 | A1* | 12/2017 | Shah | H04L 63/105 |

\* cited by examiner

*Primary Examiner* — Kevin Bechtel
(74) *Attorney, Agent, or Firm* — Thomas Horstemeyer, LLP (57) ABSTRACT

Disclosed are various examples that relate to adjusting a stringency of offline policy restrictions based on a situational context of a computing device. In one example, a system can receive an offline restriction policy for an application. The offline restriction policy comprises one or more rules that are associated with one or more actions. The system can cause the one or more actions to be performed during an offline period of time in an instance in which one of the rules is satisfied. The offline period of time representing time periods when the system does not have a network connection with a management system. The system can cause a first authentication action to be performed in an instance in which a first condition of the system satisfies a first rule. The system can also cause a second authentication action to be performed in an instance in which a second condition of the system satisfies a second rule.

20 Claims, 4 Drawing Sheets

ADAPTIVE OFFLINE POLICY ENFORCEMENT BASED ON CONTEXT

BACKGROUND

Many users of client devices prefer to conduct work-related tasks on their own personal devices—rather than use a second, enterprise-owned client device for such purposes. In this bring your own device (BYOD) environment, IT administrators are tasked with enforcing enterprise security policies on users' personal client devices, since those client devices are being used to access enterprise resources. These client devices, which can include, desktops, laptops, and other computing devices, can communicate with a management server through a network connection. The management server required the network connection with the client devices to appropriately enforce the enterprise security policies on the client devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to adjusting a stringency of offline policy restrictions based on a situational context of a client device. Oftentimes, when client devices are subject to policy enforcement, the policies are binary in nature. For example, a policy can dictate for a client device that a hardware component, such as a camera, should either be turned on or be turned off. When situational conditions are considered, a client device communicates over a network the detected situational conditions to a management system. Then, the management system can instruct the client device to perform an action or sequence of actions according to the situational conditions. For example, the policy can require that the camera be turned off when a user enters a particular building with the client device. In many cases, the problem with this approach is that the client device must always have a network connection with the management system. Additionally, once a stricter restriction is applied, the client device cannot automatically enforce a less strict restriction without receiving instructions from the management system.

Various examples of the present disclosure relate to dynamically causing the stringency of an offline application policy to be adjusted for an application based on a situational context of the client device. In an instance in which the client device does not have a network connection, the client device can locally execute offline policies that can increase or decrease software and hardware restrictions on the client device. Some non-limiting examples can include adjusting logical access restrictions and application restrictions based on the situational context of the client device, even though the client device does not have a network connection to a management system. Particularly, an application authentication process can become stricter or less strict based on the situational context of a particular client device. Additionally or alternatively, restrictions associated with application usage, such as access to sensitive application data or application functionality, can become stricter or less strict based on the situational context of the client device.

Further, the embodiments described herein can be employed where an operating system of a client device is not managed by management software. Accordingly, the adaptive offline policies can be enforced without: installing a management agent on the client device, making API calls to the operating system of the client device, and/or otherwise causing the operating system of the client device to be managed by management software. In some examples, such adaptive offline policies can be implemented by an application that does not have permission to operate as a device administrator. The examples of the present disclosure can provide software developers with a framework for configuration of and control over applications executed by client devices.

In some embodiments, conditions that can cause the stringency of the adaptive offline policy restrictions to become stricter or less strict can include: the location of the client device, noise surrounding the client device, network connections between the client device and particular secure networks, users in view of a camera or other capture device of the client device, wired or wireless connections between the client device and other client devices, abnormal battery usage by the client device, abnormal usage of applications executed by the client device, and smart accessory devices detected by the client device. In other embodiments, any other situational conditions that can be detected by a client device can cause the stringency of the adaptive offline policy restrictions to become stricter or less strict.

The embodiments described herein provide several advantages over previous solutions. For example, the embodiments can adjust the stringency of policy restrictions without management of the operating system of the client device. Additionally, the embodiments can adjust the stringency of policy restrictions without a network connection to a management server. This can be useful when, for example: a user of a client device is physically located in a secure government facility where the user cannot access a public network, or the user of the client device is traveling in countries without reliable network connections. In these scenarios, the embodiments described herein can adjust the stringency of policy restrictions based on the detected context of the client device.

Figure 1:
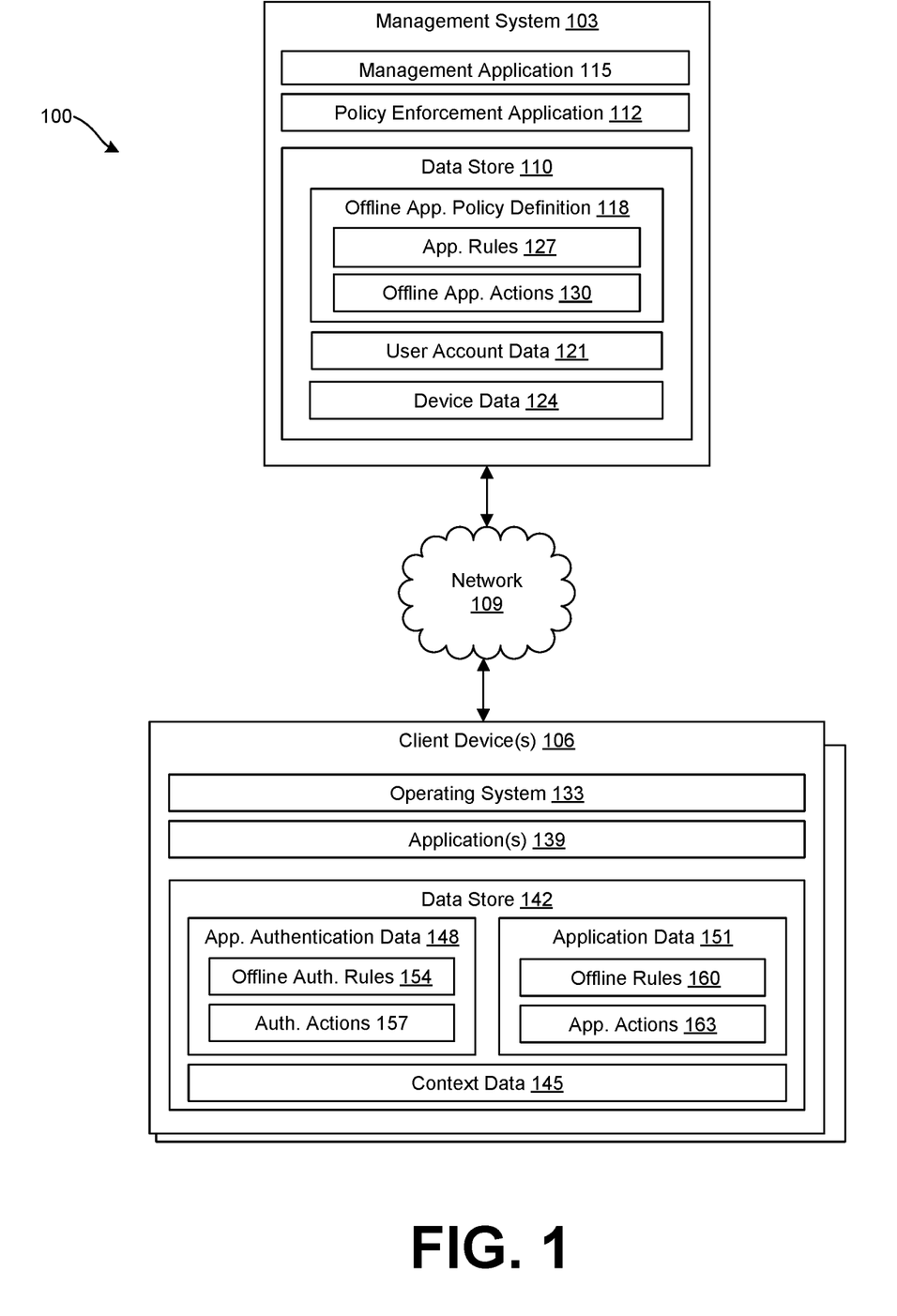
FIG. 1 is a drawing of an example of a networked environment that includes a management system and a client device.

With reference to FIG. 1, shown is an example of a networked environment 100. The networked environment 100 can include a management system 103 and client device(s) 106 in communication with one another over a network 109. The management system 103 can manage the operation of applications and a data store 110. The management system 103 can execute a policy enforcement application 112 and a management application 115.

The management system 103 can include a server computer or any other system providing computing capability. Alternatively, the management system 103 can include a plurality of computing devices that are arranged, for example, in one or more server banks, computer banks, or other arrangements. The management system 103 can include a grid computing resource or any other distributed computing arrangement. The computing devices can be located in a single installation or can be distributed among many different geographical locations. The management system 103 can also include or be operated as one or more virtualized computer instances. For purposes of convenience, the management system 103 is referred to in the singular. Even though the management system 103 is referred to in the singular, it is understood that a plurality of management systems 103 can be employed in the various arrangements as described above.

The policy enforcement application 112 can facilitate an initial application enrollment of a client device 106 with the management system 103. A user of the client device 106 can download and install a respective third-party application. Then, upon invoking the respective application for a first time, the respective application can interact with the policy enforcement application 112. The policy enforcement application 112 can request a user identity, password, and other suitable identity credentials. The policy enforcement application 112 can verify the user identity with a user directory stored in the data store 110. In other scenarios, a user can configure application settings as instructed by an IT administrator, which can enable the application to access the policy enforcement application 112. In this scenario, the unique application settings for accessing the policy enforcement application 112 can serve as part of the enrollment process. After the respective application has been enrolled, the management system 103 can transmit to the client device 106 an offline application policy definition 118 over the network 109.

The policy enforcement application 112 can provide updates of the offline application policy definition 118 periodically over time to the client device 106. In some cases, the developer can update the offline application policy definition 118 over time. The policy enforcement application 112 can provide these updates the client device 106 over the network 109. In other cases, the management system 103 may be operated by an IT administrator of an enterprise, such as one or more organizations, to manage the operations of the application.

The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks.

In some examples, an enterprise, such as one or more companies or other organizations, can operate the management application 115 to oversee or manage the operation of the client devices 106 of its employees, contractors, customers, students, or other users having user accounts with the enterprise. An enterprise can be any customer of the management application 115, and such an enterprise can also be referred to as an organization. The enterprise or organization can have a hierarchy. A hierarchy can be an organizational structure that links the individuals and/or groups in the enterprise. For example, an individual or group can be responsible for management of one or more subordinate individuals or groups, who can in turn be responsible for management of one or more subordinate individuals or groups, and so on.

The management application 115 can cause various software components to be installed on the client device 106. Such software components can include, for example, client applications 139, an agent application, resources, libraries, drivers, or other similar components that require installation on the client device 106 as specified by an administrator of the management application 115. The management application 115 can further cause policies to be implemented on the client device 106. Policies can include, for example, compliance rules, restrictions, or permissions pertaining to capabilities of a client device 106 such that access to enterprise data and/or enterprise applications is secure on the client device 106.

The management application 115 can interact with one or more applications 139 executed on the client device 106 to perform management functions. In one example, the management application 115 can interact with an agent application to enroll the client device 106 with the management application 115. When enrolled, the agent application can be registered as a device administrator of the client device 106, which can provide the agent application with sufficient privileges to control the operation of the client device 106. In one example, the agent application can be registered as the device administrator through the installation of a management profile at an operating system 133, which causes the operating system 133 to designate the agent application as the device administrator.

The management application 115 can direct the agent application to perform various device management functions on the client device 106. For example, the management application 115 can direct the agent application to control access to certain software or hardware functions available on the client device 106. As a result, the management application 115 can verify that the configuration and operation of the client device 106 is in conformance with predefined criteria that ensures that enterprise data or other data is protected from data loss, unauthorized access, or other harmful events.

The management application 115 further provide enterprise data to the client device 106 through the agent application. In one example, the management application 115 can cause the agent application to control use of the client device 106 or provision enterprise data to the client device 106 through use of a command queue provided by the management application 115. In some examples, the management application 115 can store commands in a command queue associated with a particular client device 106 and can configure the agent application executed by such client device 106 to retrieve the contents of the command queue. In one example, the agent application can be configured to retrieve the contents of the command queue on a configured interval, such as every four hours, or upon detection of a certain event, such as an unauthorized application being executed by the client device 106. The management application 115 can also push commands to the agent application over the network 109.

In any case, the agent application can receive the contents of the command queue from the management application 115. In one example, the contents of the command queue can include a command that the agent application should cause to be executed on the client device 106. In another example, the contents of the command queue can include a resource or an application 139 that the agent application should cause to be installed on the client device 106, which the client device 106 can access through a specified uniform resource locator (URL).

The management system 103 can also include a data store 110. The data stored in the data store 110 can include, for example, the offline application policy definition 118, the user account data 121, and the device data 124. The offline application policy definition 118 can include one or more application rules 127 related to hardware restrictions, software restrictions, logical access restrictions, application restrictions, and other suitable restrictions that can be performed on the client device 106. The offline application policy definition 118 can be configured by a developer of the application or an administrator of an enterprise. In some cases, the logical access restrictions can be related to authentication techniques, which can enable a user access to the application.

Additionally, the application restrictions can include restrictions related to application data, a set of application functions, or some combination of both application data and application functions. The offline application policy definition 118 can also include one or more application actions 130. The client device 106 can cause one or more of the application actions 130 to be performed if one or more of the application rules 127 are satisfied by situational conditions associated with the client device 106. For instance, a developer or an IT administrator can specify whether Bluetooth® functionality, camera functionality, microphone functionality, or other suitable device functionality is permitted for use by the application 139 on the client device 106. In this instance, the application 139 is permitted use of device functionality based on certain situational conditions, such as the location of the client device 106, a wired or wireless network connection, a noise level surrounding the client device 106, or other suitable conditions that can identified by the client device 106. In another example, the application action 130 can relate to identifying an application authentication technique, among several available authentication techniques, to be performed based on the context of the client device 106. For example, an application action 130 can include using a one-time password (OTP), using a biometric recognition technique, using a simple password, using a complex password, or other suitable authentication techniques. In addition, the application actions 130 can include different forms of multi-factor authentication. Some non-limiting examples of multi-factor authentication can include different combinations of a knowledge factor, a possession factor, and/or a biometric method. In some examples, the application action 130 can involve a single-factor authentication, such as a knowledge factor (e.g. a password). In other examples, the application action 130 can involve a two-factor authentication, such as both a knowledge factor and a possession factor (e.g. in possession of a smart device or a client device).

The user account data 121 can include information pertaining to end users of the client devices 106 enrolled with the management system 103. For instance, the user account data 121 can include data used to authenticate an end user, such as a username, password, email address, biometric data, device identifier, registry identifier, or other suitable data. Additionally, the user account data 121 can include other information associated with an end user, such as name, organization unit, or other information. Each user account can be associated with a particular entity, such as an enterprise, employer, or other entity.

The device data 124 can include indications of the state of the client device 106. In one example, the state of the client device 106 can specify applications that are installed on the client device 106, configurations or settings that are applied to the client device 106, user accounts associated with the client device 106, the physical location of the client device 106, the network to which the client device 106 is connected, and other information describing the current state of the client device 106.

The client device 106 can be representative of one or more client devices 106. The client device 106 can include a processor-based system, such as a computer system, that can include a mobile device, a desktop computer, a speaker system, a laptop computer, a personal digital assistant, a cellular telephone, a smartphone, a set-top box, a music player, a tablet computer system, a game console, an electronic book reader, a wearable smart accessory, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability. The client device 106 can also include one or more image capturing devices, an audio capturing device, a location detecting unit, and other suitable hardware devices.

The client device 106 can include an operating system 133 configured to execute various client-side applications 139. Some applications 139 can access network content served up by the management system 103 or other servers, thereby rendering a user interface on a display, such as a liquid crystal display (LCD), touch-screen display, or other type of display device. To this end, some applications 139 can include a web browser or a dedicated application, and a user interface can include a network page, an application screen, or other interface. Further, other applications 139 can include device management applications, enterprise applications, social networking applications, word processors, spreadsheet applications, media viewing applications, or other applications.

In some examples, at least a portion of the applications 139 are "managed applications" where an agent application oversees or controls operation of the applications 139. For instance, using an administrator console, an administrator of the management application 115 can distribute, secure, and track applications 139 installed on client devices 106 enrolled with the management application 115. In some examples, the agent application can configure and verify that managed applications operate in conformance with the compliance rules.

The application 139 can include a software application executable on the client device 106. In some examples, the application 139 can be executable on a client device, such as a smartphone, a tablet device, a wearable computing device, a smart accessory device, or other suitable computing devices. The application 139 can be executed on the client device 106 and can be in communication with the management system 103 over the network 109. In some cases, the application 139 can be executed without the presence of a network connection, particularly without a connection to the management system 103.

The client device 106 can also include a data store 142. The data store 142 can include memory of the client device 106 or any other storage resources on which data can be stored by the client device 106. The data store 142 can include context data 145, application authentication data 148, application data 151, and other suitable data stored in the client device 106. The context data 145 can include data describing different situational conditions and/or behavior associated with the client device 106. For example, the context data 145 can include location data of the client device 106, network connections between the client device 106 and particular networks, noise level data surrounding the client device, users in view of a camera or other capture device of the client device, wired or wireless network connections between the client device 106 and other client devices, whether the client device 106 is physically plugged into another computing device, whether the user is wearing a smart accessory device, and other suitable condition data detectable by the client device 106. The context data 145 can also include data related to patterns of usage associated with the client device 106, such as battery usage, application usage, location patterns associated with client device 106, and other suitable patterns detectable by the client device 106.

The application authentication data 148 can include authentication rules 154 and authentication actions 157. The authentication rules 154 can include one or more rules related to identifying particular triggering conditions from the context data 145. The authentication rules 154 can be used to identify the appropriate authentication action 157 to be performed on the client device 106. In an instance in which a respective authentication rule 154 is satisfied by the context data 145, the client device 106 can cause the corresponding authentication action 157 to be performed during an offline period. For example, the context data 14 can indicate that the client device 106 is presently located in a government facility. In this example, the respective authentication rule 154 is satisfied by the present location of the client device 106. The corresponding authentication action 157 can cause a biometric authentication technique to be performed in order for the user to have access to the application 139. The authentication rules 154 and authentication actions 157 can be derived from the offline application policy definition 118 received from the management system 103. During the offline period, the stringency of the authentication rules 154 and authentication actions 157 can become stricter or less strict as the context data 145 changes. The authentication rules 154 and authentication actions 157 can be updated upon receiving an updated offline application policy definition 118 from the management system 103.

The application data 151 can include one or more offline rules 160 and one or more application actions 163. The client device 106 can cause one or more of the application actions 163 can be performed if one of the offline rules 160 is satisfied. In some cases, the offline rules 160 and application actions 163 are only accessible after the user has been authenticated. In this scenario, the offline rules 160 and application actions 163 can be stored in a secure memory location. The offline rules 160 and application actions 163 can be derived from the offline application policy definition 118 received from the management system 103. The offline rules 160 can include rules related to identifying particular triggering conditions. The application actions 163 can involve application restrictions, such as application data restrictions or application functionality restrictions. For example, an offline rule 160 can involve analyzing the context data 145 to detect that the client device 106 is currently located in a restricted location, such as China. The corresponding application action 163 for the respective offline rule 160 can involve restricting the application functionality of the application 139, such as an email application. For instance, the email application can restrict the user to only be able to review email currently stored on the client device 106 and restrict the user from sending and receiving new email. One skilled in art would appreciate that the application 139 can include other applications.

As another example, the application 139 can be a finance application that manages the approval process for budgets in a department. For example, a first offline rule 160 for the finance application can include determining that a budget request is for less than $1,000. If the first offline rule 160 is satisfied, then a first application action 163 can include using a retina scan to verify the present user is authorized to approve the budget request. A second offline rule 160 can include determining whether the budget request is between $1,000 and $10,000. If the budget request is in this dollar amount range, then a second application action 163 can include causing the client device 106 to perform the retina scan and verify a one-time password prior to allowing the user to approve of the budget request In addition, the application actions 163 can include restricting access to different tiers of application data stored in the client device 106. For instance, a particular offline rule 160 can restrict access to confidential data in an instance in which other users can be viewed by the camera of the client device 106. In other examples, the application actions 163 can restricting access to backend resources associated with the application 139.

Next, a general description of the operation of the various components of the networked environment 100 is provided. To begin, a user can download and install an application 139 on the client device 106. After the installation, the application 139 can prompt the user to enroll the client device 106 with the policy enforcement application 112. The enrollment process can involve verifying the user's identity with a corporate directory stored in the management system 103. The user can enter a user login and a password to verify the identity of the user for the enrollment for the application 139. In other scenarios, the user's IT administrator can provide the user with application settings for configuring the application 139.

Next, the application 139 can receive an initial offline application policy definition 118 from the management system 103. The received offline application policy definition 118 can include authentication rules 154 and authentication actions 157 that are stored in application authentication data 148. The received offline application policy definition 118 can also include offline rules 160 and associated application actions 163 that are stored within application data 151. In some examples, the application data 151 can be associated with an application container for the application 139. The application container can isolate the application data 151 for additional security. Thus, in some examples, the offline rules 160 and application actions 163 may not be accessible without the user being authenticated.

After storing the offline application policy definition 118, the user can initiate a request to invoke the application 139. In some examples, the application 139 can identify that the client device 106 does not have a network connection to management system 103. For example, the user and the client device 106 are located in a secure government facility that does not allow access to the network 109. In other cases, the user can be asked to turn off wireless data communication capabilities of the client device 106. During this offline period, the application 139 can execute a user authentication process. The application 139 can identify an authentication technique to use based on an analysis of the context data 145 collected. In some cases, the application 139 can begin collecting context data 145 after it has been initially configured. In other cases, the application 139 can begin collecting context data 145 after receiving the request to start the application 139.

Continuing with the previous example, the application 139 can determine from the context data that the client device 106 is currently located in a restricted location. In this example, the restricted location can be a secure government facility, a defined military location, a secure enterprise location, a restricted country, or other defined restricted locations.

The application 139 can determine that the restricted location of the client device 106 satisfies one of the authentication rules 154. If a particular authentication rule 154 is satisfied by the restricted location, the corresponding authentication action 157 of the particular authentication rule 154 can involve causing the client device 106 to perform a biometric recognition technique for authentication. For example, the particular authentication action 157 can cause a fingerprint recognition technique to be performed. In other words, the particular authentication rule 154 satisfied by the context data 145 determines which of the authentication actions 157 can be selected for authenticating the user.

Additionally, in some examples, the authentication rules 154 can be organized in a tiered structure. For example, the application 139 can determine if a first authentication rule 154 is satisfied. If the first authentication rule 154 is not satisfied, then the application 139 can evaluate whether a second authentication rule 154 is satisfied. If so, the application 139 can execute an authentication action 157 associated with the second authentication rule 154. The second authentication action 157 can be more restrictive than the first authentication action 157. For example, the second authentication action 157 can involve causing both a biometric authentication scan and a user interface prompt for a complex password. Thus, the first authentication action 157 can be a single-factor authentication process and the second authentication action 157 can be a two-factor authentication process. In other words, the second authentication rule 154 involves an additional authentication aspect in comparison to the first authentication rule 154.

In some examples, the application 139 can maintain using the second authentication rule 154 for authenticating a user for a time period. In other words, the application 139 can use the second authentication rule 154 for authenticating the user at a different point in time. Thus, the application 139 can continue to use the escalated authentication rule 154 the next time the user is required to authenticate their identity under the present security threat conditions. In some implementation, the application 139 can determine whether to deescalate to the first authentication rule 154 after a time period. For example, the application 139 can determine after six hours whether the context data 145 satisfies the first authentication rule 154. In other words, the application 139 can determine whether to deescalate to the first authentication rule 154 if certain conditions are met. In this case, the present security conditions of the client device 106 can be lower than before because of the recently detected context data 145. Thus, a change in the security conditions of the client device 106 can deescalate the authenticate rules 154. For example, a change in location from a highly restricted location to a less restrictive location can cause a deescalation to the first authentication rule 154. In other examples, a deescalation can occur after a period of time has passed. Accordingly, the stringency of the authentication rules 154 can be dynamically adjusted according to the context data 145 during an offline period.

After the user has been authenticated, the user can access the application 139. At this point, the application 139 can execute one or more offline rules 160 based on the context data 145. The offline rules 160 can involve application restrictions, such as application data restriction, application functionality restrictions, or other suitable application restrictions.

For example, the context data 145 can indicate that the client device 106 is located in a predefined secure location and the client device 106 has no connection to a network. The application 139 can determine that the present location of the client device 106 satisfies a first offline rule 160. The corresponding application action 163 can include enabling full access to application data and application functionality. If the first offline rule 160 is not satisfied, the application 139 can determine if a second offline rule 160 is satisfied. The second offline rule 160 can be configured to determine whether the client device 106 is not located in the predefined location and has access to a cellular network. If the second offline rule 160 is satisfied, the application 139 can cause the corresponding application action 163 to be performed, which may restrict portions of sensitive data from being accessed by the user.

In this example, if the second offline rule 160 is not satisfied, the application 139 can determine whether a third offline rule 160 is satisfied. The third rule 160 can be configured to identify that the client device 106 is located in a restricted location, such as outside of the country. If the third offline rule 160 is satisfied, the application 139 can cause the corresponding application action 163 to be performed, which may restrict access to both sensitive application data and certain application functionality. Accordingly, on the client device 106, the stringency of the offline rules 160 can be adjusted according to the context data 145.

In another example, the client device 106 can be in a scenario where it has no network connection. In this scenario, the first offline rule 160 can relate to identifying in an instance in which a noise level surrounding the client device 106 is below a threshold. If the first offline rule 160 is satisfied, the client device 106 can cause the first application action 163 to be performed. The first application action 163 may involve enabling full access to application data and application functionality. If the noise level is above the threshold, then the application 139 can evaluate a second offline rule 160.

The second offline rule 160 can evaluate whether a number of users are in view of one or more cameras of the client device 106 is below a threshold. One approach can be to detect a number of faces of users that are facing or oriented in a direction of an image capturing device of the client device 106. For example, the second offline rule 160 can have a threshold of two faces that are oriented in the direction of the client device 106 and within a proximity of client device 106. Thus, if two or more faces of users are looking at the image capturing device of the client device 106 and within a proximity, then the second offline rule 160 is satisfied. In another approach, the client device 106 can have two image capturing devices, where each image capturing device is oriented in a different direction. Thus, the second offline rule 160 can be set to determine whether a number of individuals in each direction is less than a threshold.

If the second offline rule 160 is satisfied, then a second application action 163 can restrict access to certain application functions. For example, the application 139 can be an email application. The second application action 163 can involve restricting the user from sending and receiving emails.

In this example, if the second offline rule 160 is not satisfied, then the application 139 can evaluate a third offline rule 160. The third offline rule 160 can involve identifying whether a smart accessory device of the user is detectable within a proximity of the client device 106. For example, the client device 106 can determine whether the smart accessory device is detectable by a wireless network protocol, such as WI-FI, Bluetooth, Zigbee, Wireless USB, NFC, RFID, and other suitable short-distance wireless network technologies. If the third offline rule 106 is satisfied, the third application action 163 can involve restricting access to sensitive email data. If the third offline rule is not satisfied, the application 139 can block the user from accessing the application 139. Thus, on the client device 106, the stringency of the offline rules 160 can be adjusted during an offline period. The client device 106 locally determines whether to escalate or deescalate the requirements for authenticating a user and/or accessing application resources according to the offline rules 160 and authentication rules 154.

Additionally, the application 139 can collect other context data 145. For example, the application 139 can detect network data, such as a type of a network connection between the client device 106 and a particular network, a network name, wireless security credentials, and other suitable wireless network data. The application 139 can also detect a number of users in view of one or more cameras of the client device 106. In some examples, the context data 145 can include facial recognition data for authenticating the user by way of the camera. The context data 145 can also indicate whether the client device 106 is physically plugged into another computing device. For example, the client device 106 can be a smartphone that is physically connected to a personal computer.

Additionally, the context data 145 can include data related to common patterns, such as battery usage, application usage, location patterns, wireless network signal strength, and other suitable patterns detectable by the client device 106. The common patterns can be gathered over time by the client device 106. After a pattern of usage has been determined, the application 139 can identify an abnormal event or a deviation from the pattern of usage. Further, the context data 145 can include whether the client device 106 is within proximity of a smart accessory device associated with the user. For example, a smart accessory device can include a physical activity tracker, a smartwatch, a phone headset, an optical head-mounted display, such as smart glasses, and other suitable smart accessory devices. A pattern of usage can include a time period of application usage and a time of day of usage for a smart accessory device. In one example, an abnormal event can include an instance in which a physical activity tracker is not connected to the client device 106 by 9:00 AM on a Monday.

As another example, the application actions 163 can be used to manage application sessions for the application 139. The application session can refer to a period of time for an authenticated user using the application 139. In some cases, an offline rule 160 can relate to a time limit for an authenticated user to use the application 139. After the time limit has expired, the corresponding application action 163 can prompt the user to reauthenticate the application session.

Figure 2:
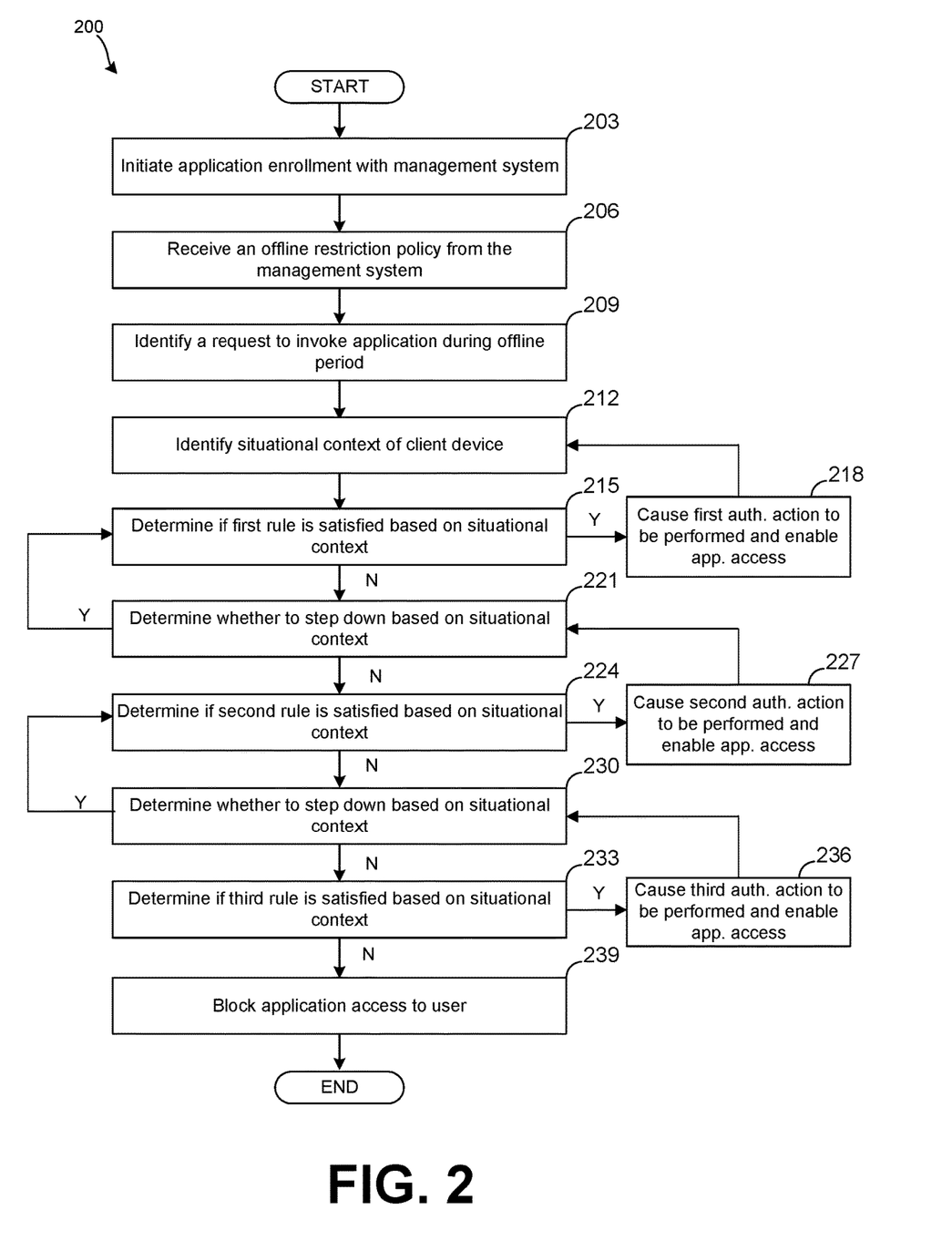
FIGS. 2 and 3 are example flowcharts illustrating functionalities implemented by an application executed in the client device.

With reference to FIG. 2, shown is a flowchart 200 that provides one example of the operation of a portion of the application 139 according to various examples. It is understood that the flowchart 200 of FIG. 2 provides merely an example of the many different types of functional arrangements that can be employed to implement the operation of the portion of the application 139 as described herein.

Beginning with step 203, the application 139 can communicate with the policy enforcement application 112 in order to initiate an enrollment of the application 139 for use on the client device 106. The application 139 can initiate a communication session with the policy enforce application 112 after the application 139 has been downloaded and installed on the client device 106. In some examples, the application 139 can initiate the enrollment process with the policy enforcement application 112 in response to executing the application 139 for the first time or in response setting up a user account.

Then, in step 206, the client device 106 can receive the offline application policy definition 118 from the management system 103. The offline application policy definition 118 can include authentication rules 154 and offline rules 160 that are stored in the data store 142. In some examples, the offline rules 160 can be stored in memory associated with application container or some other suitable secure memory location.

In step 209, the client device 106 can identify a request to invoke the application 139. The request can be generated by the user selecting an icon of the application 139 on a display of the client device 106.

In step 212, the application 139 can identify a situational context of the client device 106 when the request was made based on the context data 145. The situational context can include various conditions associated with the client device 106, such as a location of the client device 106, a noise level surrounding the client device 106, verification of a number of users within view of the cameras of the client device 106, identifying an abnormal event or sequence from typical usage, and other suitable situational contexts detectable by the client device 106.

In step 215, the application 139 can determine an instance in which a first authentication rule 154 is satisfied. This determination can involve evaluating whether the present conditions of client device 106, as represented in the context data 145, satisfy the first authentication rule 154. If so, the application 139 can proceed to step 218.

At step 218, the application 139 can cause a first authentication action 157 associated with the first authentication rule 154 to be performed. For example, the first authentication action 157 can involve using a biometric technique for authenticating the user. The first authentication action 157 can be a single factor authentication process. After the user is authenticated, the application 139 enables the user to access the application functionality and data. In some examples, after a time period has passed, the application 139 can require the user to re-authenticate. In this scenario, the application 139 proceeds to step 212 to determine the latest situational context of the client device 106. If the first authentication rule 154 is not satisfied at step 215, then the application 139 proceeds to step 221.

At steps 221 and 224, the application 139 can analyze whether to escalate to the second authentication rule 154 or deescalate to the first authentication rule 154. At step 221, the application 139 determines whether to step down to the first authentication rule 154 based on the latest context data 145.

At step 224, if the application 139 can determine that the second authentication rule 154 is satisfied, then the application 139 proceeds to step 227. Step 224 can involve determining whether the conditions represented in the context data 145 satisfy the second authentication rule 154.

At step 227, the application 139 can cause a second authentication action 157 associated with the second authentication rule 154 to be performed. The second authentication action 157 can be a stricter form of authentication for accessing the application 139. In some examples, the second authentication action 157 can be a two factor authentication process. For example, the second authentication action 157 can involve using both a biometric scan technique and a complex password. After authentication is complete, the application 139 enables the user to access the application functionality and data. In some examples, the application 139 can require the user to reauthenticate after a period of time has passed by proceeding back to step 221.

At step 221, the application 139 can evaluate whether to step down to the first authentication rule 154 based on the latest context data 145. For example, at step 221, the application 139 can determine that using the second authentication rule 154 is no longer required because the security concerns detected earlier in the context data 145 are no longer an issue. If this is the case, the application 139 proceeds back to step 215. If not, the application 139 proceeds to step 224 to determine if the second authentication rule 154 is still satisfied.

If the second authentication rule 154 is not satisfied in step 224, the application 139 can proceed to the steps 230 and 233, which represents a potential escalation for authentication. At step 230, the application 139 can determine whether to step down to the second authentication rule 154 and proceed to step 224.

At step 233, the application 139 can determine whether a third authentication rule 154 is satisfied. If so, the application 139 can proceed to step 236, where the application 139 can cause the corresponding authentication action 157 to be performed.

If the third authentication rule 154 is not satisfied, the application 139 can proceed to step 239. At step 239, the application 139 cause the user to be blocked from accessing the application 139. The application 139 then proceeds to the end.

Figure 3:
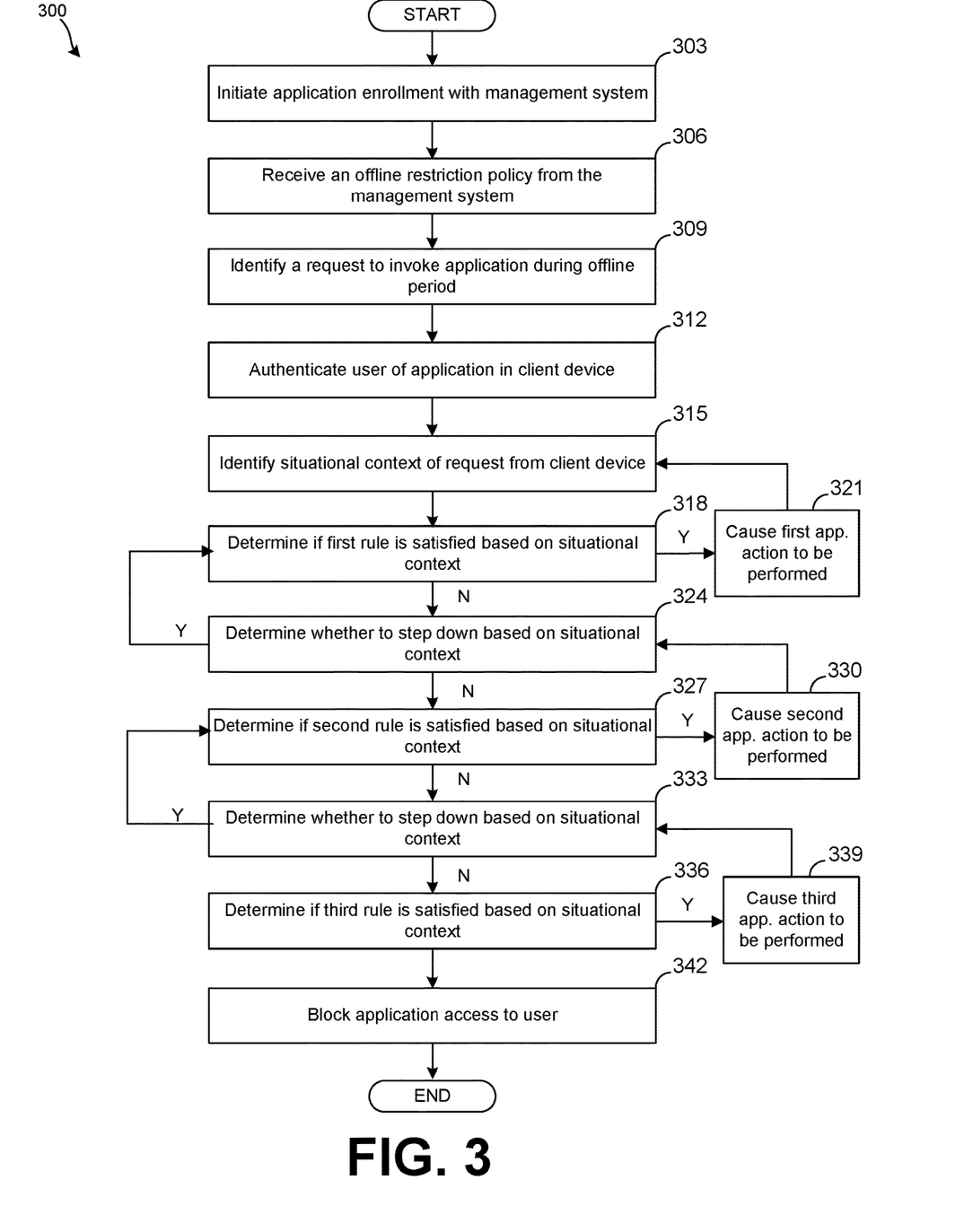

With reference to FIG. 3, shown is a flowchart 300 that provides one example of the operation of a portion of the application 139 according to various examples. It is understood that the flowchart of FIG. 3 provides merely an example of the many different types of functional arrangements that can be employed to implement the operation of the portion of the application 139 as described herein.

Beginning with step 303, the application 139 can communicate with the policy enforcement application 112 in order to initiate an enrollment of the application 139 for use on the client device 106.

Then, in step 306, the client device 106 can receive the offline application policy definition 118 from the management system 103. The offline application policy definition 118 can include authentication rules 154 and offline rules 160 that are stored in the data store 142. In some examples, the offline rules 160 can be stored in memory associated with application container or some other suitable secure memory locations.

In step 309, the client device 106 can identify a request to invoke the application 139. In some examples, the request is identified based on a user manipulating an application icon on a display of the client device 106.

At step 312, the application 139 can authenticate the user on the client device 105. In some examples, the application 139 can execute the steps discussed with respect to FIG. 2 for determining an appropriate authenticate technique based on the security conditions represented in the context data 145.

Next, in step 315, the application 139 can identify a situational context of the client device 106 based on the context data 145. The context data 145 can indicate the present security conditions of the client device 106. For example, in some instances, the present security conditions of the client device 106 can indicate a low or high level of security concerns from the context data 145.

In step 318, the application 139 can determine if a first offline rule 160 is satisfied based on the situational context represented in the context data 145. This determination can involve evaluating whether the context data 145 satisfies the first offline rule 160. If so, the application 139 can proceed to step 321.

At step 321, the application 139 can cause a first application action 163 associated with the first offline rule 160 to be performed. For example, the first application action 163 can involve using an application functionality restriction or an application data restriction. In this example, if the application 139 is an email application, the first application action can enable full access to all email functionality and email data. In some examples, after a time period has passed, the application 139 can reassess the context data 145 of the client device 106. In this scenario, the application 139 proceeds to step 315 to determine the latest situational context of the client device 106. If the first offline rule 160 is not satisfied, then the application 139 proceeds to steps 324 and 327.

At steps 324 and 327, the application 139 can analyze whether to escalate to the second offline rule 160 or deescalate to the first offline rule 160. At step 324, the application 139 can determine whether to step down to the first offline rule 160 based on the conditions of the client device 106 as represented in the context data 145.

At step 327, the application 139 can determine whether the second offline rule 160 is satisfied. If so, the application 139 proceeds to step 330. At step 330, the application 139 cause a second application action 163 associated with the second offline rule 160 to be performed. The second application action 163 can involve a stricter application restriction than the first application action 163. In other words, the second application action 163 can provide a greater restriction of access to application data or application functionality for the user in comparison to when the first application action 163 is applied. In some cases, the greater restriction for application data can involve preventing the user from accessing highly confidential data and a confidential data. Continuing the previous example, the second application action 163 can involve restricting email functionality, such as restricting the client device 106 from sending and receiving new emails. In some examples, the application 139 can reassess the second offline rule 160 for the client device 106 after a period of time has passed. Thus, at step 324, the application 139 can evaluate whether to step down to the first offline rule 160 based on the situational context of the client device 106. If so, the application 139 can proceed to step 318. If not, the application 139 can proceed to step 327 to determine if the second offline rule 160 is still satisfied.

If the second offline rule 160 is not satisfied in step 327, the application 139 can proceeds to steps 333 and 336. At step 333, the application 139 can determine whether to step down to the second offline rule 160 and proceed to step 327.

At step 336, the application 139 can determine whether a third offline rule 160 is satisfied based on the latest situational context represented in the context data 145. If so, the application 139 proceeds to step 339 in order to execute the corresponding third application action 163. The third application action 163 associated with the third offline rule 160 can cause both the restriction of application functionality and the restriction of access to sensitive data. For example, third application action 163 can involve causing the user to be restricted from accessing confidential data and restricting the user from the certain application functionality.

If the third offline rule 160 is not satisfied in step 336, the application 139 can proceed to step 342. At step 342, the application 139 blocks the users from accessing to the application 139. The application 139 then proceeds to the end.

Figure 4:
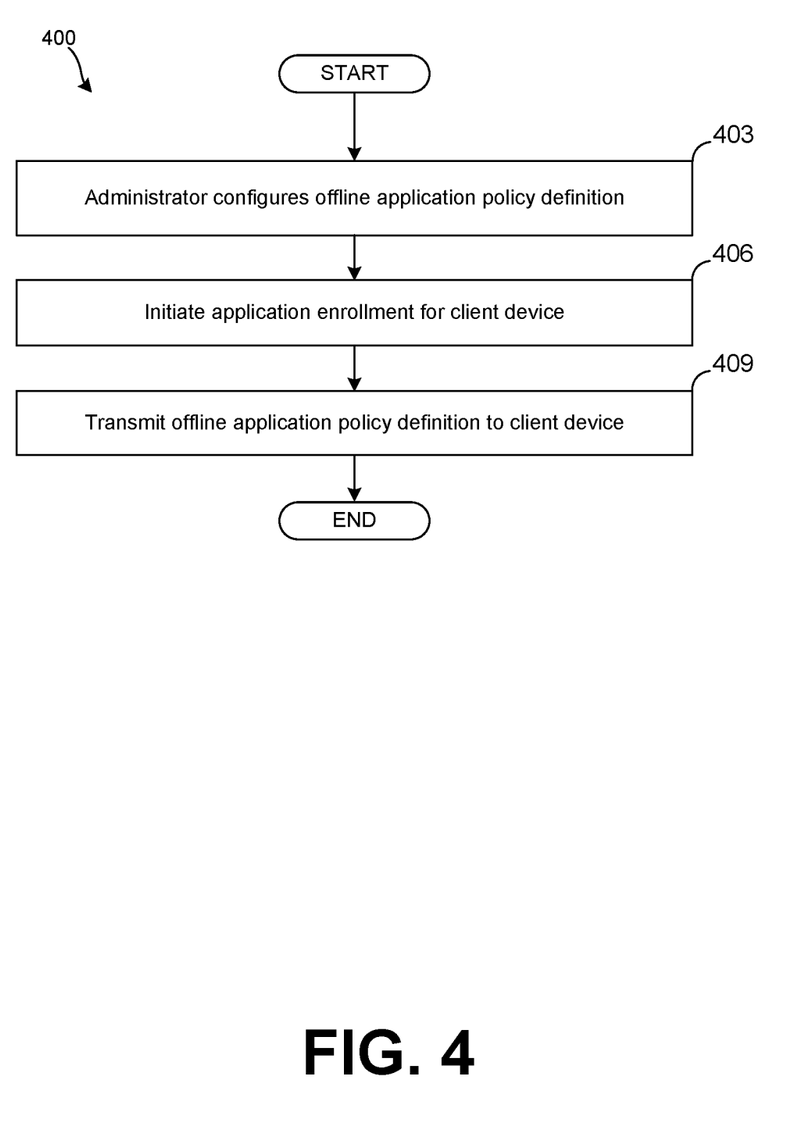
FIG. 4 is an example flowchart illustrating functionalities implemented by a policy enforcement application executed in the management system.

Referring next to FIG. 4, shown is a flowchart 400 that provides one example of the operation of a portion of the policy enforcement application 112 according to various examples. It is understood that the flowchart of FIG. 4 provides merely an example of the many different types of functional arrangements that can be employed to implement the operation of the portion of the policy enforcement application 112 as described herein.

Beginning with step 403, the policy enforcement application 112 can receive a configuration of the offline application policy definition 118 for the application 139. This configuration involves receiving application rules 127 and their corresponding application actions 130. In some examples, the policy enforcement application 112 can be configured by an IT administrator. For example, a user interface can be rendered that enables the administrator to set the offline application policy definition 118 for the application 139. In other examples, the policy enforcement application 112 can receive an offline application policy definition file from an entity associated with the developer of the application 139.

At step 406, the policy enforcement application 112 can initiate an application enrollment for a user on the client device 106. In some examples, the enrollment process can involve an initial verification of the identity of the user or a configuration of device settings for the client device 106 to be able to securely communicate with the management system 103.

At step 409, the policy enforcement application 112 can transmit the offline application policy definition 118 to the client device 106. In some examples, a developer of the application 139 or an enterprise can modify application rules 127 and the application actions 130. The policy enforcement application 112 can periodically provide an updated version of the offline application policy definition 118 to the client device 106.

The management system 103, the client devices 106 and other suitable devices can include at least one processor circuit, for example, having a processor and at least one memory device, both of which couple to a local interface, respectively. The client device 106 can include, for example, at least one computer, a mobile device, smartphone, a table computer, a speaker system, a personal assistant device, a computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display upon which user interface(s) generated by the application(s) 139, the operating system 133, or another application can be rendered. The client device 106 can also include one or more input/output devices that can include, for example, a capacitive touchscreen or other type of touch input device, fingerprint reader, or keyboard.

Although the management application 115, the policy enforcement application 112, then the operating system 133, the application 139, and other various services and functions described can be embodied in software or code executed by general purpose hardware as discussed above. As an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described examples of the present disclosure are merely possible examples of implementations described for a clear understanding of the principles of the disclosure. Many variations and modifications can be made to the above-described examples without departing substantially from the spirit and principles of the disclosure. All such modifications and variations are intended to be included within the scope of this disclosure.

Therefore, the following is claimed:

1. A system, comprising:
  a computing device; and
  program instructions executable in the computing device that, when executed by the computing device, cause the computing device to:
    receive, from a management server, an offline restriction policy associated with an application executed by the computing device, the offline restriction policy comprising a plurality of rules that are individually associated with at least one of a plurality of offline application actions, the plurality of offline application actions comprising actions performed by the application during an offline period of time;
    identify a request to execute the application during the offline period of time, the offline period of time representing a time period in which the computing device does not have a network connection with the management server;
    determine a situational context of the computing device based on a first condition associated with the computing device satisfying a first one of the plurality of rules;
    cause a first authentication action from the plurality of offline application actions to be performed in an instance in which the first condition associated with the computing device satisfies the first one of the plurality of rules, the first authentication action comprising a single-factor authentication process;
    cause an application restriction to be enforced for the application on the computing device based on the identification of the computing device being in the offline period of time;
    detect a change in the situational context of the computing device during the offline period of time based on a second condition satisfying a second one of the plurality of rules in an instance in which the first condition has been satisfied; and
    cause a second authentication action from the plurality of offline application actions to be performed in an instance in which the second condition associated with the computing device satisfies the second one of the plurality of rules, the second authentication action comprising a two-factor authentication process.

2. The system of claim 1, wherein the first authentication action comprises a biometric authentication, and wherein the second authentication action comprises both a one-time password authentication and the biometric authentication.

3. The system of claim 1, wherein
  the first application restriction comprises at least one of an application data restriction or an application functionality restriction.

4. The system of claim 1, wherein the application restriction comprises a first application restriction, and the program instructions, when executed by the computing device, further cause the computing device to:
  cause a second application restriction to be enforced in an instance in which a third condition associated with the computing device satisfies a third one of the plurality of rules, the second application restriction providing a greater restriction of application data than the first application restriction for a user of the system.

5. The system of claim 1, wherein the instance in which the first condition associated with the computing device satisfies the first one of the plurality of rules further comprises an indication that a noise level surrounding the computing device has exceeded a threshold.

6. The system of claim 5, wherein the instance in which the second condition associated with the computing device satisfies the second one of the plurality of rules further comprises an indication in which a number of persons are in proximity to the computing device based at least in part upon an image captured by an image capturing device.

7. The system of claim 1, wherein the application restriction comprises a first application restriction which restricts a first set of application functions, and the program instructions, when executed by the computing device, further cause the computing device to at least:
  cause a second application restriction to be enforced in an instance in which a third condition of the system satisfies a third one of the plurality of rules, the second application restriction restricting a second set of application functions that includes a larger quantity of restricted application functions than the first set of application functions.

8. The system of claim 1, wherein the detection of the change in the situation context of the computing device further comprises:
  determine a pattern of usage for an accessory device in proximity to the computing device; and
  detect an abnormal event from the pattern of usage for the accessory device.

9. A non-transitory computer-readable medium comprising executable instructions which, when executed by at least one computing device, cause the at least one computing device to at least:
  receive, from a management server, an offline restriction policy associated with an application executed by the at least one computing device, the offline restriction policy comprising a plurality of rules that are individually associated with at least one of a plurality of offline application actions, the plurality of offline application actions comprising actions performed by the application during an offline period of time;

identify a request to execute the application during the offline period of time, the offline period of time representing a time period where the at least one computing device does not have a network connection with the management server;

determine a situational context of the at least one computing device based on a first condition associated with the at least one computing device satisfying a first one of the plurality of rules;

cause a first authentication action from the plurality of offline application actions to be performed in an instance in which the first condition associated with the at least one computing device satisfies the first one of the plurality of rules, the first authentication action comprising a single-factor authentication process;

cause an application restriction to be enforced for the application on the computing device based on the identification of the computing device being in the offline period of time;

detect a change in the situational context of the at least one computing device during the offline period of time based on a second condition satisfying a second one of the plurality of rules in an instance in which the first condition has been satisfied; and cause a second authentication action from the plurality of offline application actions to be performed in an instance in which the second condition associated with the at least one computing device satisfies the second one of the plurality of rules, the second authentication action comprising a two-factor authentication process.

10. The non-transitory computer-readable medium of claim 9, wherein the first authentication action comprises executing a biometric authentication action, and wherein the second authentication action comprises both a one-time password action and the biometric authentication action.

11. The non-transitory computer-readable medium of claim 9, wherein
the first application restriction comprises at least one of an application data restriction or an application functionality restriction.

12. The non-transitory computer-readable medium of claim 9, wherein the application restriction comprises a first application restriction, and the executable instructions, when executed by the at least one computing device, further causes the at least one computing device to at least:
cause a second application restriction to be enforced in an instance in which a fourth condition associated with the at least one computing device satisfies a fourth one of the plurality of rules, the second application restriction providing a greater restriction of application data than the first application restriction.

13. The non-transitory computer-readable medium of claim 9, wherein the instance in which the second condition associated with the at least one computing device satisfies the second one of the plurality of rules further comprises an indication in which a number of faces of individuals are in proximity to the at least one computing device based at least in part upon an image captured by an image capturing device.

14. The non-transitory computer-readable medium of claim 13, wherein the indication of the number of faces of individuals in proximity to the at least one computing device further comprises an instance in which at least one of the number of faces of individuals is oriented in a direction toward the at least one computing device.

15. The non-transitory computer-readable medium of claim 9, wherein the application restriction comprises a first application restriction which restricts a first set of application functions, and the executable instructions, when executed by the at least one computing device, further causes the at least one computing device to at least:
cause a second application restriction to be enforced in an instance in which a third condition satisfies a third one of the plurality of rules, the second application restriction restricting a second set of application functions that includes a larger number of restricted application functions than the first set of application functions.

16. A method, comprising:
receiving, from a management system by a computing device, an offline restriction policy associated with an application executed by the computing device, the offline restriction policy comprising a plurality of rules that are individually associated with at least one of a plurality of offline application actions, the plurality of offline application actions comprising actions performed by the application during an offline period of time;

identifying, by the computing device, a request to execute the application during the offline period of time, the offline period of time representing a time period in which the computing device does not have a network connection with the management system;

determining, by the computing device, a situational context of the computing device based on a first condition associated with the computing device satisfying a first one of the plurality of rules;

causing, by the computing device, a first authentication action from the plurality of offline application actions to be performed in an instance in which the first condition associated with the computing device satisfies the first one of the plurality of rules, the first authentication action comprising a single factor authentication process;

causing, by the computing device, an application restriction to be enforced for the application on the computing device based on the identification of the computing device being in the offline period of time;

detecting, by the computing device, a change in the situational context of the computing device during the offline period of time based on a second condition satisfying a second one of the plurality of rules in an instance in which the first condition has been satisfied; and causing, by the computing device, a second authentication action from the plurality of offline application actions to be performed in an instance in which the second condition associated with the computing device satisfies the second one of the plurality of rules, the second authentication action comprising a two factor authentication process.

17. The method of claim 16, wherein the first authentication action comprises a biometric authentication action and the second authentication action comprises both a one-time password action and the biometric authentication action.

18. The method of claim 16, wherein the application restriction comprises a first application restriction, and further comprising:
causing, by the computing device, a second application restriction to be enforced in an instance in which a fourth condition associated with the computing device satisfies a fourth one of the plurality of rules, the second application restriction providing a greater restriction of application data than the first application restriction.

19. The method of claim 16, wherein the instance in which the first condition associated with the computing device satisfies the first one of the plurality of rules further comprises an indication that a noise level surrounding the computing device has exceeded a threshold.

20. The method of claim 16, wherein the instance in which the second condition associated with the computing device satisfies the second one of the plurality of rules further comprises an indication in which a number of persons are in proximity to the computing device based at least in part upon an image captured by an image capturing device.

\* \* \* \* \*